United States Patent
Yoon

(10) Patent No.: US 7,722,008 B2
(45) Date of Patent: May 25, 2010

(54) LOAD SUPPORT APPARATUS FOR CABIN OF HEAVY EQUIPMENT

(75) Inventor: Chun Jin Yoon, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 373 days.

(21) Appl. No.: 11/289,977

(22) Filed: Nov. 30, 2005

(65) Prior Publication Data

US 2006/0273234 A1 Dec. 7, 2006

(30) Foreign Application Priority Data

Jun. 1, 2005 (KR) .................. 10-2005-0046889
Oct. 14, 2005 (KR) .................. 10-2005-0096992

(51) Int. Cl.
*F16M 1/00* (2006.01)

(52) U.S. Cl. ................. 248/638; 180/89.12; 267/141.1; 296/190.07

(58) Field of Classification Search ............. 180/89.19, 180/89.13, 89.12; 267/141.1; 296/190.07, 296/35.1; 248/638
See application file for complete search history.

(56) References Cited

U.S. PATENT DOCUMENTS

| 3,847,492 | A | | 11/1974 | Kennicutt et al. | |
|---|---|---|---|---|---|
| 4,515,234 | A | * | 5/1985 | Loy et al. | 180/89.12 |
| 4,871,189 | A | * | 10/1989 | Van Breemen | 267/64.27 |
| 5,209,316 | A | * | 5/1993 | Bauer | 180/89.14 |
| 5,553,911 | A | * | 9/1996 | Bodin et al. | 296/190.07 |
| 5,964,310 | A | * | 10/1999 | Gyllner | 180/89.13 |
| 5,984,036 | A | * | 11/1999 | Higuchi et al. | 180/89.12 |
| 6,374,935 | B1 | * | 4/2002 | Kirschenmann et al. | 180/89.12 |
| 6,408,970 | B1 | * | 6/2002 | Eng | 180/89.12 |
| 6,758,294 | B2 | * | 7/2004 | Peddycord et al. | 180/89.12 |
| 6,810,980 | B2 | * | 11/2004 | Jo et al. | 180/89.13 |
| 7,246,846 | B2 | * | 7/2007 | Shioji et al. | 296/190.11 |
| 2003/0111281 | A1 | * | 6/2003 | Jo et al. | 180/89.13 |
| 2004/0245806 | A1 | * | 12/2004 | Mori et al. | 296/187.03 |
| 2006/0071499 | A1 | * | 4/2006 | Yoon | 296/35.1 |

FOREIGN PATENT DOCUMENTS

| JP | 5-98666 | 4/1993 |
|---|---|---|
| JP | 5-239849 | 9/1993 |
| JP | 5-255951 | 10/1993 |
| JP | 6-42012 | 2/1994 |

* cited by examiner

*Primary Examiner*—J. Allen Shriver, II
*Assistant Examiner*—Bradley H Duckworth
(74) *Attorney, Agent, or Firm*—Ladas & Parry LLP

(57) ABSTRACT

A load support apparatus for a cabin of heavy equipment is capable of overcoming the problems that a vibration absorption apparatus is very efficient for absorbing vibrations transferred from an upper frame to a cabin when heavy equipment runs or does work but is less efficient with respect to the left and right direction vibrations. The load support apparatus of a cabin of heavy equipment comprises a vibration prevention member which is engaged with an outer side of the cabin, a support bracket which is installed on an upper side of the upper frame and receives the vibration prevention member therein, and an elastic member which is installed between an outer side of the vibration prevention member and an inner side of the support bracket and absorbs the left and right direction vibrations which are transferred from the upper frame to the cabin.

3 Claims, 7 Drawing Sheets

LOAD SUPPORT APPARATUS FOR CABIN OF HEAVY EQUIPMENT

TECHNICAL FIELD

The present invention relates to a load support apparatus for a cabin of heavy equipment in which a bracket is installed at an outer side of a cabin and an upper side of an upper frame, a vibration prevention member and an elastic member are installed between the brackets, and the vibration prevention member is used as an escape prevention member so as to prevent a cabin from being escaped from the upper frame when a vibration absorption apparatus reaches an elastic limit in case of an emergency situation such as an overturn accident, etc. The load support apparatus of the present invention has overcome the conventional problems that a vibration absorption apparatus is less efficient for left and right direction vibrations while the vibration absorption apparatus can absorb the up and down vibrations transferred from an upper frame to a cabin when a heavy equipment runs or does work.

BACKGROUND ART

In view of structure, a cabin of heavy equipment should be designed such that an operator works comfortably. Moreover, in view of structure, the operator should be protected from such an unexpected accident that a heavy object falls toward the cabin during the driving or the heavy equipment is overturned at a sloped terrain during the work.

Recently, it is urgently required to develop a technology of cabin protective structure capable of securing the safety of operator on the spot as organizations such as the International Standardization Organization (ISO), the Society of Automatic Engineers (SAE) or the like become to reinforce the regulation for the cabin protective structure more strictly.

The EOPS (Excavator Operator's Protective Structure) should be designed to substantially support a load applied to a cabin in lateral, backward and vertical directions so that a transformed cabin or a heavy object does not damage an operator's body when a heavy object impacts a cabin in a lateral, vertical or backward direction during a running operation of heavy equipment.

FIG. 1 is a cross sectional view illustrating a conventional load support apparatus for a cabin of heavy equipment.

A cabin 10 is mounted on upper frame 20 using various fixing members, with the upper frame 20 being rotatably fixed to a lower driving body (not shown). If the cabin 10 is directly mounted on the upper frame 20 by a certain fixing member such as bolts, etc., the impact of the upper frame 20 may be directly applied to the cabin 10. Working conditions of heavy equipment are generally bad. Since the vibrations or noises occurring at the upper frame 20 are directly applied to the cabin 10, an operator may feel fatigue quickly.

So as to reduce the above vibrations, a plurality of vibration absorption apparatuses 40 and 40' are installed at the front and rear sides of the cabin 10, with the vibration absorption apparatuses 40 and 40' being designed to absorb the upward and downward vibrations of the cabin 10 between the upper frame 20 and a bottom plate 30 of the cabin 10, with the upper frame 20 including a plurality of through holes 18 at the upper surface of the same. The vibration absorption apparatuses 40 and 40' are engaged with the upper frame 20 by the through hole 18 and bolt members (not shown) with the flange 42 being engaged with the upper surface of the upper frame 20.

The vibration absorption apparatuses 40 and 40' have elastic members such as coil springs, rubber or elastic liquid material therein, and the cabin 10 is mounted on the upper frame 20 with the flange 42 and the bolt member. With the above constructions, the operator feels less fatigue based on a damping effect to the up and down movements and external impacts due to non-uniform ground surface.

As described above, the vibration absorption apparatuses 40 and 40' well absorb the up and down movements occurring by external impacts due to non-uniform ground surface. However, the left and right movements cannot be well absorbed thereby. As a result, cracks may occur by left and right movements or forward or backward movements at the fixed portions of the vibration absorption apparatuses 40 and 40'.

Therefore, the vibration displacement due to left and right movement increases, cracks may occur at the fixed portions of the vibration absorption apparatuses 40 and 40' engaged with the cabin 10. Namely, the cracks may occur at the flanges 42 and the bolt member for thereby increasing safety accidents.

When the loads applied in the front or side direction of the cabin 10 is sequentially transferred to the cabin 10, the bottom plate 30, the vibration absorption apparatuses 40 and 40' and the upper frame 20, the vibration absorption apparatuses 40 and 40' absorb part of the up and down vibrations, while supporting the weight of the cabin. However, the vibration absorption apparatuses do not have enough strength with respect to a considerable impact exceeding the elastic limit of the vibration absorption apparatuses 40 and 40'. In particular, in the case of an emergency situation such as an overturn accident, the cabin 10 may be escaped from the upper frame 20 due to an external impact, so that the cabin cannot be safely protected from external impacts.

DISCLOSURE OF THE INVENTION

Accordingly, it is an object of the present invention to provide a load support apparatus for a cabin of heavy equipment which overcomes the problems encountered in the conventional art.

It is another object of the present invention to provide a load support apparatus for a cabin of heavy equipment which effectively absorb left and right vibrations occurring at a cabin and an upper frame, while overcoming the problems of the conventional vibration absorption apparatuses which are weak to the left and right vibrations.

It is further another object of the present invention to provide a load support apparatus for a cabin of heavy equipment which can prevent a cabin from being escaped from an upper frame in case of an emergency situation such as a collision or overturn accident and can effectively regulate a displacement of the cabin.

To achieve the above objects, a load support apparatus is provided for a cabin of a heavy equipment which is provided with a vibration absorption apparatus installed between a bottom plate formed at a lower side of a cabin and an upper frame of a heavy equipment for elastically supporting the cabin with respect to the upper frame, the load support apparatus comprising a vibration prevention member which is engaged with an outer side of the cabin; a support bracket which is installed on an upper side of the upper frame and receives the vibration prevention member therein; and an elastic member which is installed between an outer side of the vibration prevention member and an inner side of the support bracket and absorbs the left and right direction vibrations which are transferred from the upper frame to the cabin.

To achieve the above objects, a load support apparatus is provided for a cabin of a heavy equipment which is provided with a vibration absorption apparatus installed between a bottom plate formed at a lower side of a cabin and an upper frame of a heavy equipment for elastically supporting the cabin with respect to the upper frame, the load support apparatus comprising a fixing bracket which is fixed to an outer side of the cabin and is extended horizontally; a hollow support bracket which is fixed to the upper frame and is extended longitudinally in a vertical direction and includes a circular engaging shoulder portion; a bolt type vibration prevention member which includes a vertical member thread-engaged with the fixing bracket and is extended in a vertical direction, and a head part which has a certain diameter larger than an inner side of the engaging shoulder portion; and an elastic member which is disposed between the vibration prevention member and the support bracket for thereby absorbing the left and right direction vibrations of the heavy equipment.

The fixing bracket and the support bracket are installed on the opposite side of a work apparatus.

To achieve the above objects, there is provided a load support apparatus for a cabin of a heavy equipment, comprising a vibration absorption apparatuses installed between the upper frame and the cabin for thereby elastically supporting the cabin with respect to the upper frame; stoppers which include an engaging part at one side of the same, and an escape prevention part at the other side of the same, with the engaging part being detachably fixed to the upper frame, and with the escape prevention part being installed on the upper side of the upper frame through the bottom plate, for thereby preventing the cabin from being escaped; and a vibration prevention apparatus which includes a vibration prevention member engaged with an outer side of the cabin, a support bracket installed on an upper side of the upper frame for receiving the vibration member therein, and an elastic member which is installed at an outer side of the vibration prevention member and an inner side of the support bracket for thereby absorbing the left and right direction vibrations which are transferred from the upper frame to the cabin.

The vibration absorption apparatuses are installed on the front, rear, left and right sides between the upper frame and the cabin and further installed on the center portion, and the stopper is installed on four portions at the outer side of the vibration absorption apparatus, and the vibration prevention apparatus is installed on the left and right portions of the rear side of the cabin.

The stoppers further include an engaging boss which is formed into a hollow cylindrical shape with a threaded surface on an inner side therein and is integrally installed at a lower side of the upper plate of the upper frame, and a threaded portion corresponding to the threaded surface is formed at the engaging part, and the engaging part is thread-engaged with the engaging boss.

The escape prevention part includes a bolt head shaped stop head part, and a washer shaped stopper plate which is integrally engaged with the stop head part.

The stoppers further include a rotation prevention apparatus which includes a rotation prevention plate which includes an engaging surface fixed to one side of the upper frame, and an extended surface which is extended from the engaging surface to an upper side of the upper plate of the upper frame and has a groove provided with at least one straight line portion; and a cylindrical rotation prevention boss which is installed between the engaging part and the escape prevention part and has a rotation prevention part formed on an outer surface corresponding to the straight line portion.

With the above-described constructions, since the left and right direction vibrations can be effectively absorbed by the vibration prevention apparatus in the load support apparatus for a cabin of heavy equipment according to the present invention, any cracks can be prevented at the fixing part of the vibration absorption apparatus.

MODES FOR CARRYING OUT THE INVENTION

Figure 1:
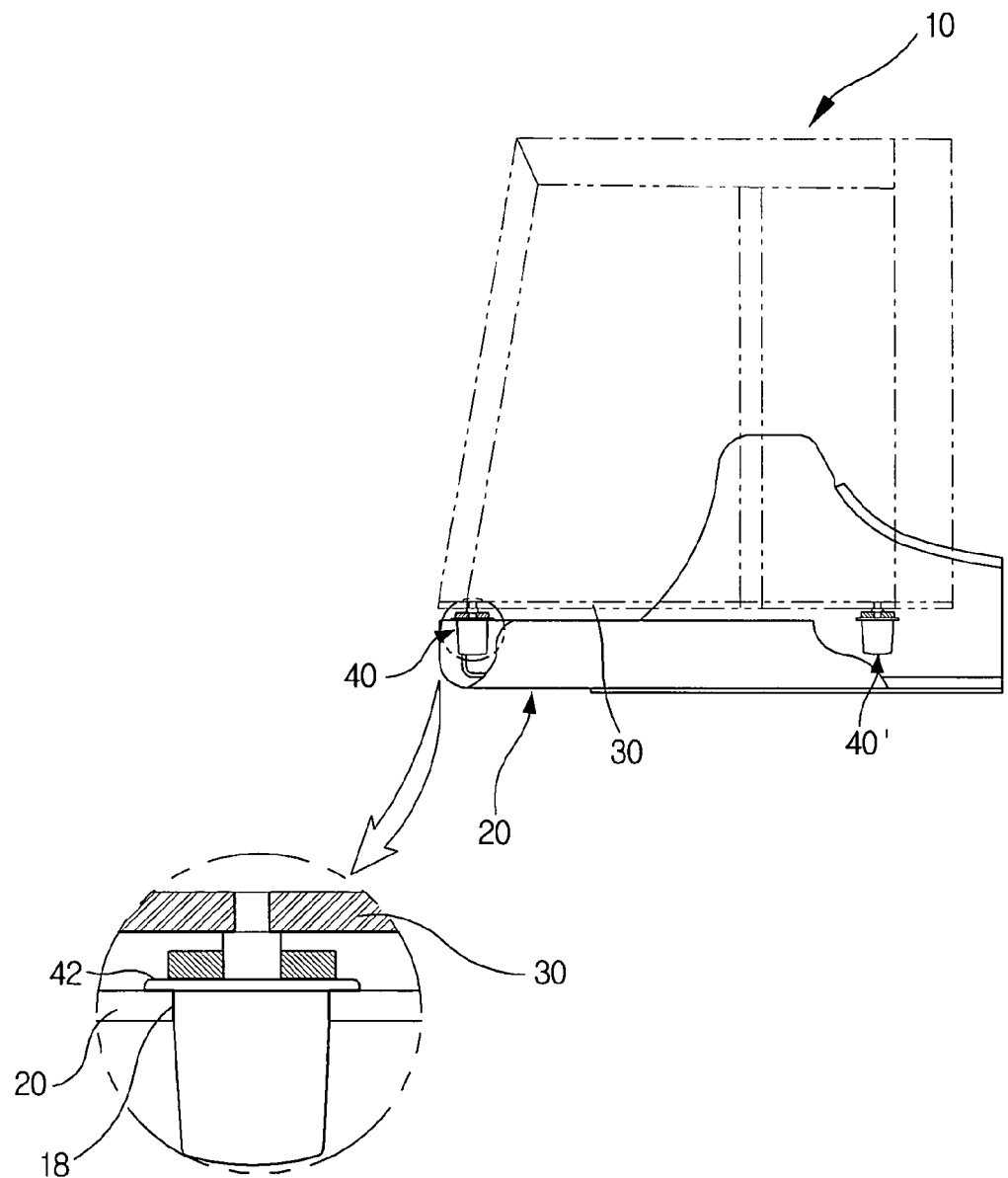
FIG. 1 is a cross sectional view illustrating the construction of a conventional load support apparatus for a cabin of heavy equipment.
Figure 2:
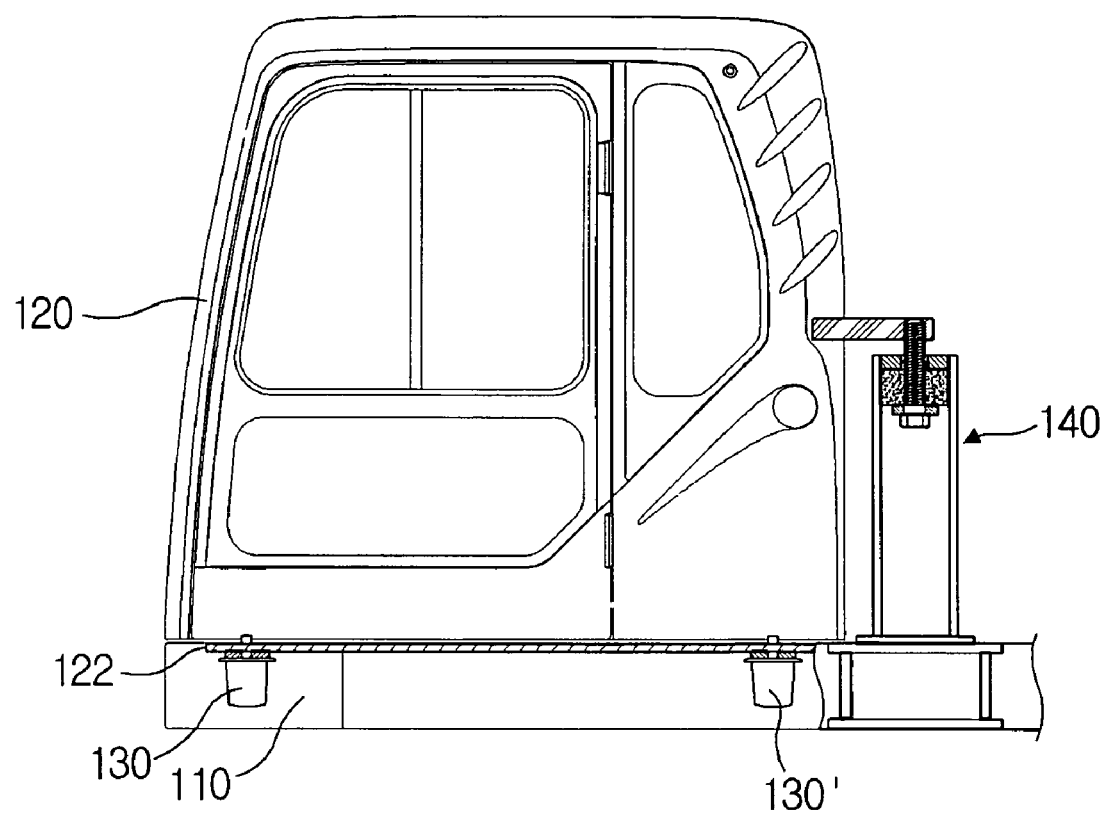
FIG. 2 is a cross sectional view illustrating the construction of a load support apparatus for a cabin of heavy equipment according to a first embodiment of the present invention.
Figure 3:
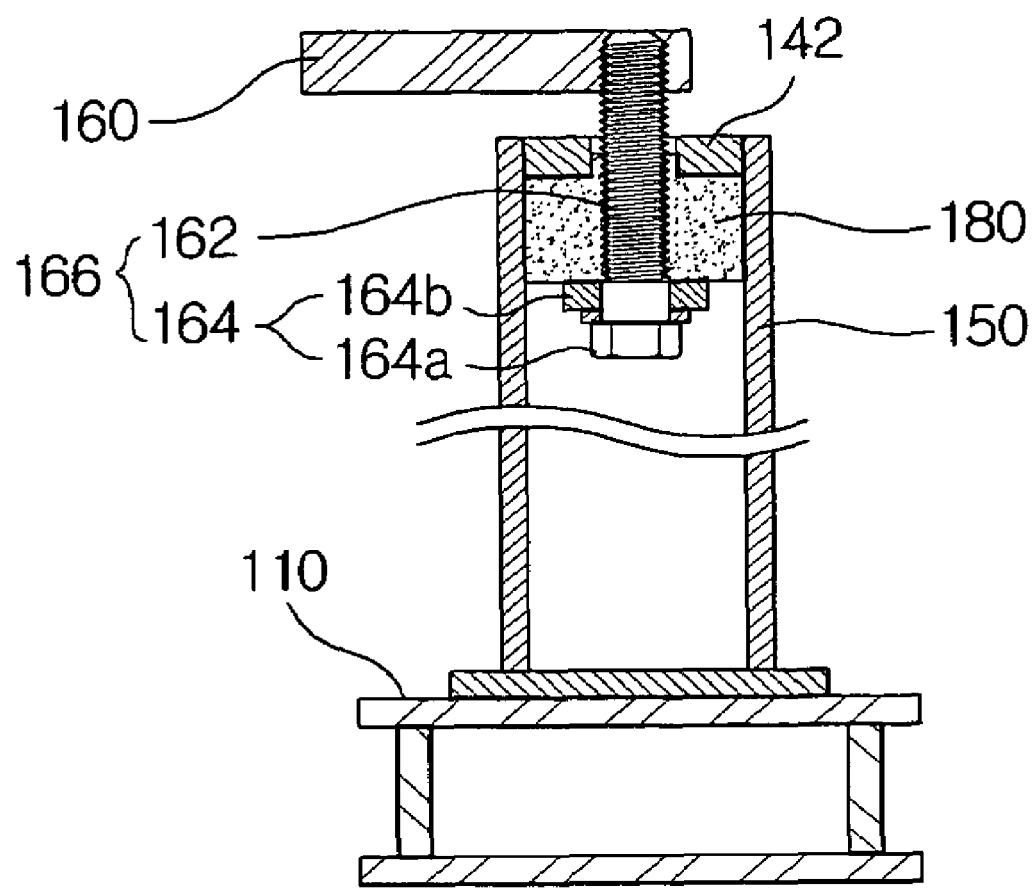
FIG. 3 is a partial cross sectional view illustrating major elements of a load support apparatus for a cabin of heavy equipment according to a first embodiment of the present invention.
Figure 4:
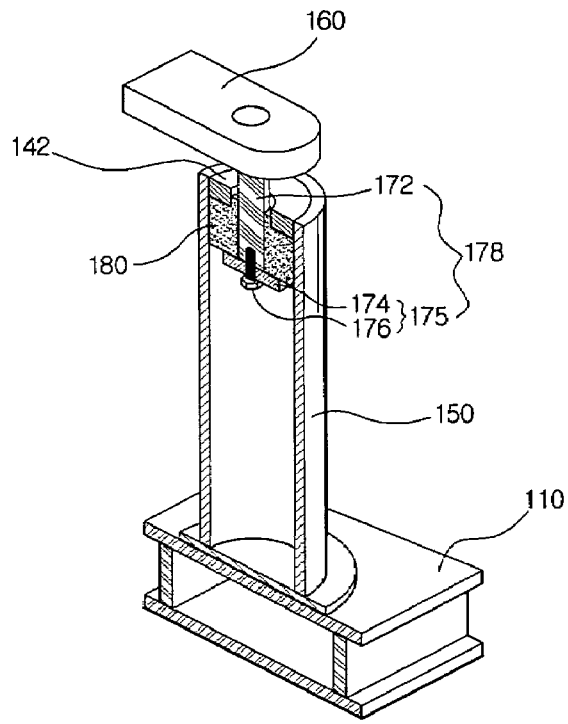
FIG. 4 is a partial cut-away perspective view illustrating major elements of a load support apparatus for a cabin of heavy equipment according to a second embodiment of the present invention.
Figure 5:
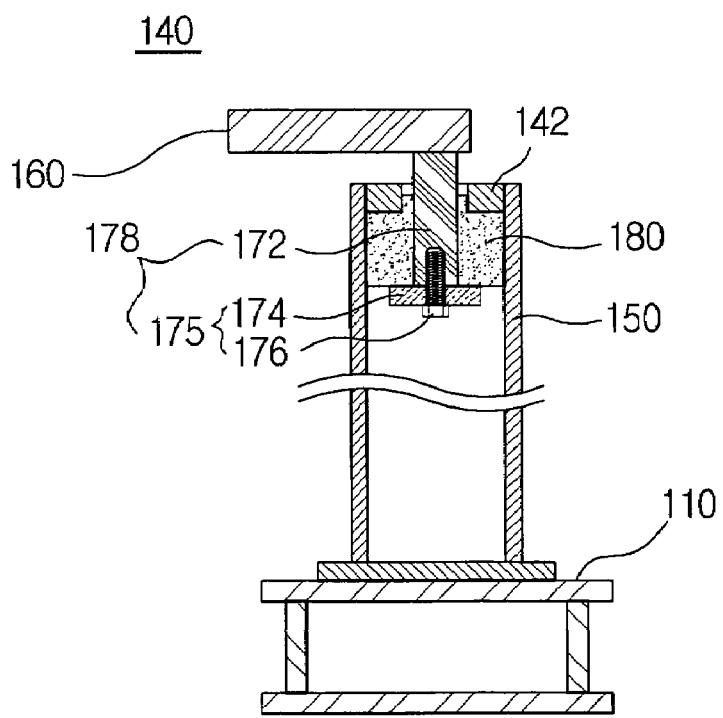
FIG. 5 is a partial cross sectional view illustrating major elements of a load support apparatus for a cabin of heavy equipment according to a second embodiment of the present invention.

FIG. 2 is a cross sectional view illustrating the construction of a load support apparatus for a cabin of heavy equipment according to a first embodiment of the present invention, FIG. 3 is a partial cross sectional view illustrating major elements of a load support apparatus for a cabin of heavy equipment according to a first embodiment of the present invention, FIG. 4 is a partial cut-away perspective view illustrating major elements of a load support apparatus for a cabin of heavy equipment according to a second embodiment of the present invention, and FIG. 5 is a partial cross sectional view illustrating major elements of a load support apparatus for a cabin of heavy equipment according to a second embodiment of the present invention.

As shown therein, there are provided vibration absorption apparatuses 130 and 130' installed between a bottom plate 122 of a cabin 120 and an upper frame 110, with the cabin 120 being engaged with an upper side of the upper frame 110 rotatably mounted on a lower driving body (not shown). There is further provided a vibration prevention apparatus 140, which prevents the left and right vibrations of the vibration absorption apparatuses 130 and 130' at usual time, and prevents the cabin 120 from being escaped or lifted up in case of an emergency situation such as overturn of equipment.

Here, the vibration absorption apparatus 130 absorbs impacts indirectly transferred to the cabin 120 at usual time like when heavy equipment runs or works for thereby enhancing a riding feel. The vibration absorption apparatus 130 is fixed to the upper frame 110 using a certain fixing member (not shown) such as bolts, etc. and the vibration absorption apparatus 130 is engaged with the bottom plate 122 by a certain fixing member (not shown) such as bolts, etc.

The vibration absorption apparatus 130 allows the cabin 120 to be fixed to the upper frame 110 and performs a function of absorbing the up and down direction impacts transferred from the upper frame 110 based on the regulations of the WBV (Whole Body Vibration). However, the vibration absorption apparatus 130 is very weak with respect to the left and right direction vibrations.

So as to overcome the above-described problems, the vibration absorption apparatus 130 includes a vibration prevention apparatus 140 as an element of overcoming the problems occurring due to the left and right direction vibrations.

Here, the vibration prevention apparatus 140 includes a vibration prevention member 166 which is engaged with an outer side of the cabin 120, a support bracket 150 which receives the vibration prevention member 166 therein, and an elastic member 180 which is installed between the vibration prevention member 166 and the support bracket 150 for absorbing the vibrations.

The support bracket 150 is formed into a hollow cylindrical shape, which is longitudinally extended in a vertical direction, and is fixed to the upper frame 110. A circular shape engaging shoulder portion 142 is provided at the upper side of the support bracket 150.

The vibration prevention member 166 includes a vertical member 162 which is extended in a vertical direction, and a head part 164 which has a certain diameter larger than the inner side of the engaging shoulder portion 142 and is formed at a lower side of the vertical member 162, so that the vibration prevention member 166 is formed into a bolt type structure. The vibration prevention member 166 is engaged with an outer side of the cabin 120 by disposing a fixing bracket 160.

The fixing bracket 160 is fixed to one side of the cabin 120 and is extended in parallel with respect to the upper frame 110, and the vertical member 162 of the vibration prevention member 166 is thread-engaged with the fixing bracket 162. The head part 164 of the vibration prevention member 166 includes a washer 164b and a bolt head 164a, which are integrally formed at the lower side of the vertical member 162.

In this embodiment of the present invention, the support bracket 150 is formed into a cylindrical shape, and the engaging shoulder portion 141 is formed into a circular plate shape. However, the support bracket 150 may be formed into an angular column shape so that the head part 164 is caught by the engaging shoulder portion 142 when the heavy equipment is overturned.

In addition, the vibration prevention member 166 according to the first embodiment of the present invention is formed into a bolt shape. As shown in FIGS. 4 and 5, the vibration prevention member 178 according to the second embodiment of the present invention may be integrally formed with the fixing bracket 160 or may be fixedly welded to the fixing bracket 160.

The vibration prevention member 178 according to the second embodiment of the present invention includes a vertical member 172 fixedly welded to the fixing bracket 160 and extended in a vertical direction, and a head part 175 which has a certain diameter larger than an inner side of the engaging shoulder portion 142 and is formed at a lower side of the vertical member. The head part 175 is caught by the engaging shoulder portion 142 and the elastic member 180 in case of emergency situation for thereby preventing the cabin from being lifted up. The head part 175 includes a washer type horizontal member 174, and a fixing member 176 such as a bolt for fixing the horizontal member 174 to an end portion of the vertical member 172. In the case that the vertical member 172 is fixedly welded to the fixing bracket 160, the welded portion may be broken by an external impact, so that it is preferred to fix the vertical member 172 to the fixing bracket 160 using bolts.

In the first and second embodiments of the present invention, the elastic member 180 is installed between the vibration prevention members 166 and 178 and the support bracket 150 for thereby absorbing the left and right direction vibrations of the heavy equipment. Here, the elastic member 180 is extended from the vertical members 162 and 172 to an inner surface of the support bracket 150 in left and right directions. In addition, the elastic member 180 is extended to the engaging shoulder portion 142 in the upward direction and is extended to the head parts 164 and 175 in the downward direction.

The elastic member 180 is preferably filled in the support bracket 150 in the left and right directions for thereby effectively absorbing left and right direction vibrations. The elastic member 180 does not work at usual time but works in case of emergency situation such as an overturn accident, etc. The elastic member 180 need not to be filled in the up and down directions because the vibration absorption apparatus 130 substantially absorbs the up and down direction vibrations at usual time. Therefore, the elastic member 180 of the present invention first supports the left and right direction loads and secondly supports the up and down direction loads.

The vibration prevention apparatus 140 is preferably installed at the opposite side of the work apparatus such as boom and arm. This is because an external impact may be minimized at the side of the cabin in which the work apparatus is positioned by the presence of the work apparatus, but the impact at the opposite side of the cabin 120 of the work apparatus may increase. Here, the work apparatus represents an assembly formed of boom and arm installed at the side of the cabin 120.

Figure 6:
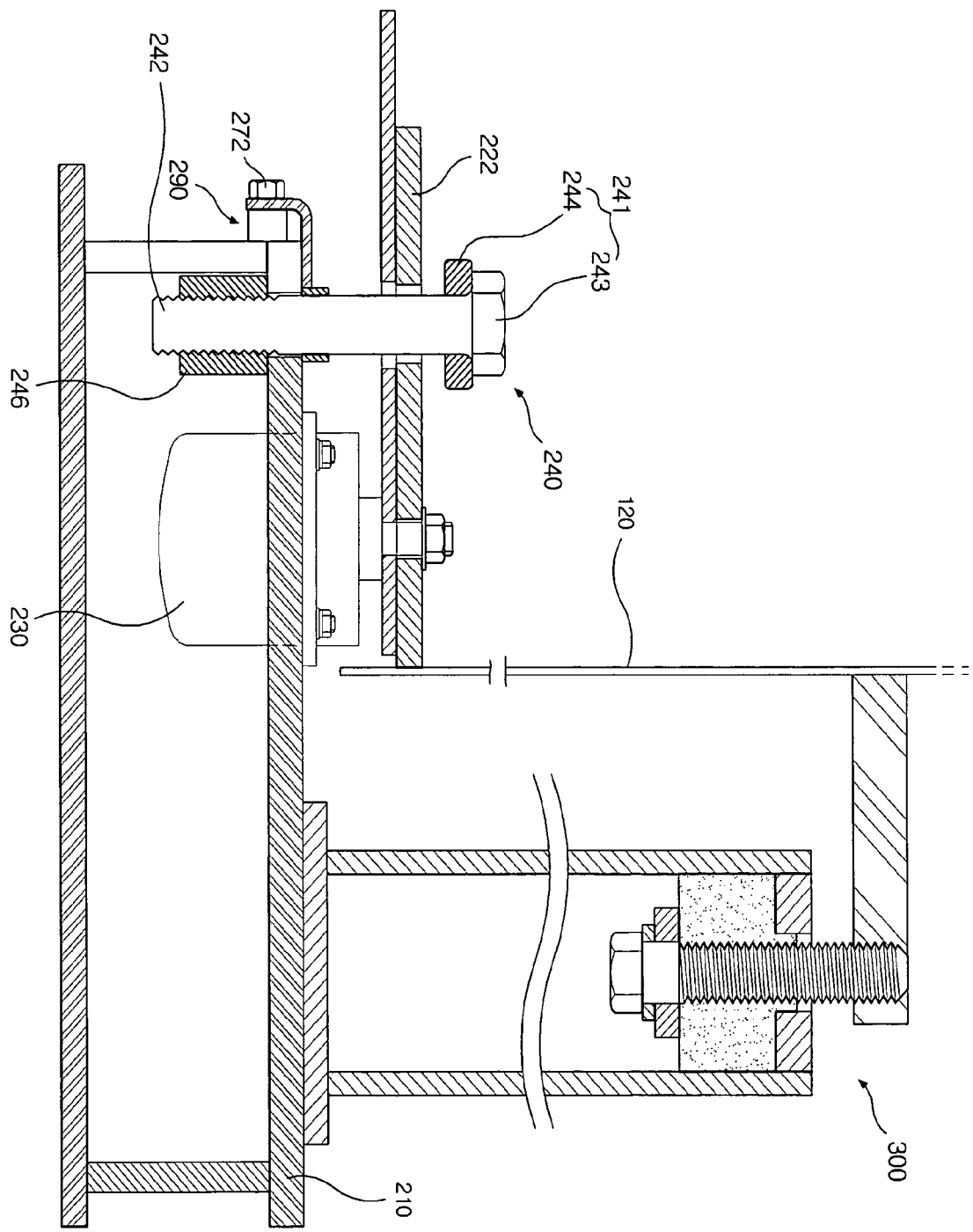
FIG. 6 is a lateral cross sectional view illustrating a construction of a third embodiment of the present invention in which lateral, backward and vertical direction loads can be effectively supported.
Figure 7:
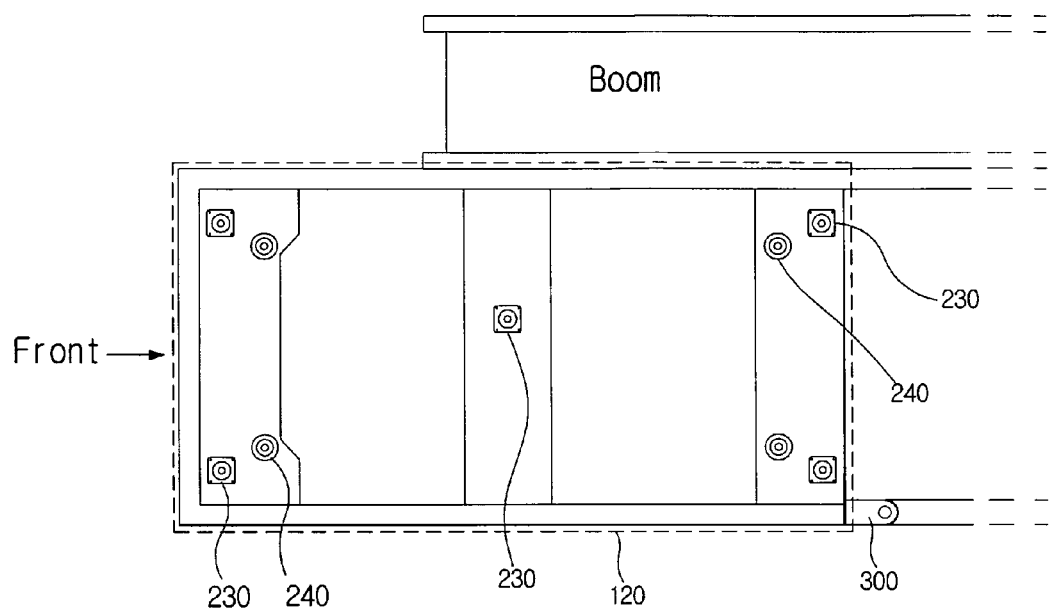
FIG. 7 is a front cross sectional view illustrating a construction of a third embodiment of the present invention in which lateral, backward and vertical direction loads can be effectively supported.
Figure 8:
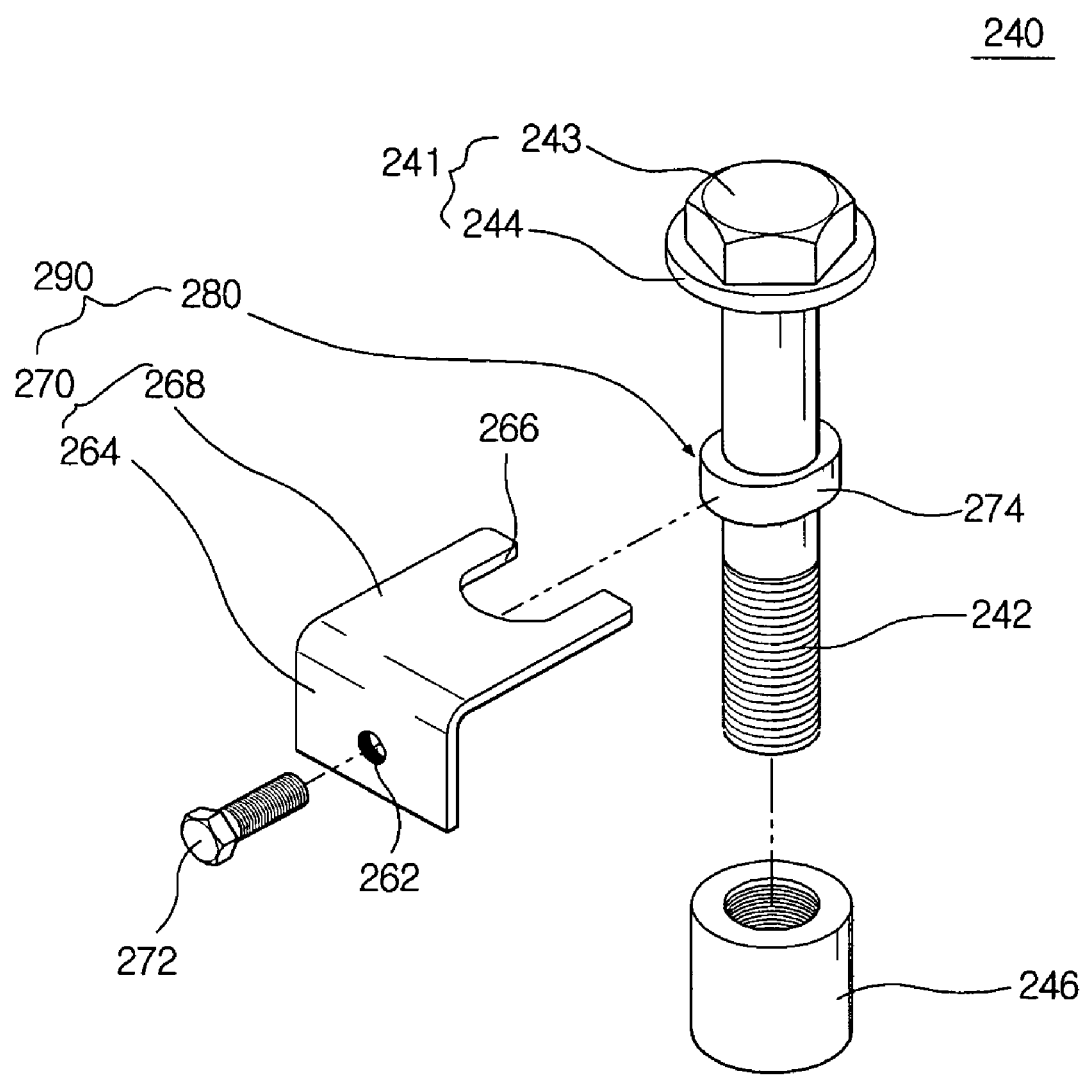
FIG. 8 is a disassembled perspective view illustrating the construction of a stopper according to a third embodiment of the present invention.

FIG. 6 is a lateral cross sectional view illustrating a construction of a third embodiment of the present invention in which lateral, backward and vertical direction loads can be effectively supported, FIG. 7 is a front cross sectional view illustrating a construction of a third embodiment of the present invention in which lateral, backward and vertical direction loads can be effectively supported, and FIG. 8 is a disassembled perspective view illustrating the construction of a stopper according to a third embodiment of the present invention.

As shown in FIG. 6, the load support apparatus for a cabin of heavy equipment according to the third embodiment of the present invention is installed between an upper frame 210 and a bottom plate 222 of a cabin 120 and includes a vibration absorption apparatus 230 which absorbs an impact indirectly transferred to the cabin 120 at usual time, a stopper 240 which prevents the cabin 120 from being escaped in case of emergency situation, and a vibration prevention apparatus 300 which absorbs left and right direction vibrations transferred to the cabin 120.

As shown in FIG. 7, the stopper 240 is preferably installed on the front, rear, left and right sides so as to support the loads applied in the lateral, backward and vertical directions of the cabin 120. Four vibration absorption apparatuses 230 are installed on the outer side of the stopper 240 and one vibration absorption apparatus 230 is installed on the center of the same. The vibration prevention apparatus 300 is preferably provided at the rear left side of the cabin 120 so as to prevent the left and right direction vibrations of the cabin 120.

The stopper 240 according to the present invention includes an engaging part 242 at one side, and an escape prevention part 241 at the other side. Here, the escape prevention part 241 includes a bolt head shaped stop head part 243, and a washer shaped stopper plate 244 integrally engaged with the stop head part 243. The engaging part 242 is extended downwards from the escape prevention part 241 and has a threaded portion on its outer surface. The stopper plate 244 is formed into a circular washer shape and is integrally fixed to the stop head part 243 by a welding method or an assembling method.

The engaging part 242 is detachably fixed to the upper frame 210 and is thread-engaged with a hollow cylindrical engaging boss 246 integrally formed at the lower side of the upper plate of the upper frame 210. A threaded surface is formed at a hollow inner surface of the engaging boss 246, and the threaded portion of the engaging part 242 is engaged with the threaded surface of the engaging boss 246.

The escape prevention part 241 is disposed above the upper side through the bottom plate 222 so that the cabin is not escaped in emergency situation.

As shown in FIG. 8, the stopper 240 according to a third embodiment of the present invention further includes a rotation prevention apparatus 290 for preventing the escape prevention part 241 from loosening. The rotation prevention apparatus 290 includes a rotation prevention plate 270, and a rotation prevention boss 280.

Here, the rotation prevention plate 270 includes an engaging surface 264 fixed to one side of the upper frame 110, and an extended surface 268 which is extended upwards over the upper plate of the upper frame 110. The engaging surface 264 is provided with a fixing hole 262 and is fixed to one side of the upper frame 110 by a rotation prevention fixing member 272. At least one straight line part 266 is formed at one side or both sides of the end portion of the extended surface 268 in channel shapes. The rotation prevention plate 270 is formed into a bent shape based on the construction of the engaging surface 264 and the extended surface 268, so that the entire construction of the rotation prevention plate 270 is formed into an angled structure.

A rotation prevention boss 280 is installed between the escape prevention part 241 and the engaging part 242 of the stopper 240. Here, the rotation prevention boss 280 is formed into a cylindrical shape and includes a rotation prevention part 274 having a flat surface corresponding to the straight line part 266 of the extended surface 268. Therefore, the engaging surface 264 is fixed to one side of the upper frame by the fixing member 272, with the rotation prevention part 274 contacting with the straight line part 266 of the extended surface 268, so that the escape prevention part 241 is prevented from loosening.

As described above, the present invention overcomes the problems that the vibration absorption apparatuses well absorb the up and down vibrations but are weak to absorb the left and right direction vibrations, with the vibrations being transferred from the upper frame to the cabin when heavy equipment runs on the non-uniform ground or does work. In the present invention, the brackets are installed at the outer side of the cabin and the upper side of the upper frame, and the vibration prevention member and elastic member are installed between the brackets.

The present invention has the following advantages.

First, since the vibration prevention apparatuses effectively absorb the left and right direction vibrations even when the heavy equipment runs or does work on a non-uniform ground, so that it is possible to prevent cracks at the fixed portions of the vibration absorption apparatuses. In addition, since the cabin is supported in left and right directions, the operator does not feel fatigue even when he works for a long time.

Second, since the vibration prevention apparatuses are capable of preventing the escape of the cabin during an accident such as an overturn accident, etc., the loads can be effectively supported.

The present application contains subject matter related to Korean paten application no. 2005-46889 and 2005-96992, respectively filed in the Korean Patent Office on Jun. 1, 2005 and Oct. 14, 2005, the entire contents of which being incorporated herein by reference.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A load support apparatus for a cabin of a heavy equipment, comprising:

vibration absorption apparatuses installed between an upper frame of a heavy equipment and a cabin for thereby elastically supporting the cabin with respect to the upper frame, wherein the cabin is provided with a bottom plate at its lower side and mounted on the upper frame;

stoppers which include an escape prevention part at one side thereof and, an engaging part extended downwards from the escape prevention part with the engaging part being detachably fixed to the upper frame, and with the escape prevention part being installed on the upper side of the upper frame through the bottom plate, for thereby preventing the cabin from being, released said escape prevention part including a bolt head shaped stop head part, and a washer shaped stopper plate which is integrally engaged with the stop head part; and a vibration prevention apparatus which includes a vibration prevention member engaged with an outer rear side of the cabin, a support bracket installed on an upper side of the upper frame for receiving the vibration prevention member therein, and an elastic member which is installed between an outer side of the vibration prevention member and an inner side of the support bracket for thereby absorbing the left and right direction vibrations which are transferred from the upper frame to the cabin, the vibration prevention member engaging with an outer side of the cabin by disposing a fixing bracket which is fixed to the rear side of the cabin in parallel with respect to the upper frame and the support bracket being formed into a hollow cylindrical shape which is longitudinally extended in a vertical direction and being fixed to the upper frame;

wherein the stoppers further comprise:

a rotation prevention plate which includes an engaging surface fixed to one side of the upper frame and an extended surface which is extended upwards over an upper side of the upper frame, the engaging surface being provided with a fixing hole and fixed to one side of the upper frame by a rotation-prevention fixing member, the extended surface being provided with at least one straight line part formed at the edge portion thereof in channel shapes; and a cylindrical rotation prevention boss which is installed between the engaging part and the escape prevention part and has a rotation prevention part formed on an outer surface corresponding to the straight line part, thereby preventing the escape prevention part from loosening by fixedly contacting the rotation prevention part with the straight line part.

2. The apparatus of claim 1, wherein the stoppers are installed on the front, rear, left and right sides so as to support loads applied in the lateral, backward and vertical directions of the cabin and four vibration support apparatus are installed on the outer side of the stopper and said vibration prevention apparatus is installed at the rear left side of the cabin.

3. The apparatus of claim 1, wherein said stoppers further include an engaging boss which is formed into a hollow cylindrical shape with a threaded surface on an inner side therein and is integrally installed at a lower side of the upper plate of the upper frame, and a threaded portion corresponding to the threaded surface is formed at the engaging part, and the engaging part is thread-engaged with the engaging boss.

* * * * *